United States Patent [19]

Kato

[11] Patent Number: 4,888,642
[45] Date of Patent: Dec. 19, 1989

[54] VIDEO SIGNAL PROCESSOR

[75] Inventor: Sumio Kato, Nagaokakyo, Japan

[73] Assignee: Mitsubishi Denki Kabushiki Kaisha, Tokyo, Japan

[21] Appl. No.: 267,336

[22] Filed: Nov. 4, 1988

[30] Foreign Application Priority Data

Nov. 7, 1987 [JP] Japan ................... 62-281735

[51] Int. Cl.⁴ .............. H04N 5/14; H04N 11/18; H04N 11/12; H04N 9/47
[52] U.S. Cl. ..................... 358/160; 358/14; 358/36; 358/167
[58] Field of Search .............. 358/12, 14, 15, 18, 358/21 R, 31, 36, 40, 160, 167

[56] References Cited

U.S. PATENT DOCUMENTS

| | | | |
|---|---|---|---|
| 4,052,736 | 10/1977 | Griffiths | 358/14 |
| 4,684,976 | 8/1987 | Sugihara et al. | 358/31 |
| 4,739,391 | 4/1988 | Takei et al. | 358/18 |
| 4,748,499 | 5/1988 | Ueda | 358/36 |
| 4,750,037 | 6/1988 | Kido et al. | 358/36 |

FOREIGN PATENT DOCUMENTS

| | | |
|---|---|---|
| 55-150669 | 11/1980 | Japan . |
| 62-58793 | 3/1987 | Japan . |
| 62-122492 | 6/1987 | Japan . |

Primary Examiner—Edward L. Coles, Sr.
Assistant Examiner—Michael D. Parker
Attorney, Agent, or Firm—Birch, Stewart, Kolasch & Birch

[57] ABSTRACT

A video signal processing circuitry which comprises a first arithmetic circuit adapted to receive a line sequential signal, a first 1H delay circuit for delaying an output from the first arithmetic circuit for a length of time equal to one horizontal period, a second 1H delay circuit for delaying an output from the first 1H delay circuit for a length of time equal to one horizontal period, a second arithmetic circuit adapted to receive the line sequential signal and the output from the second 1H delay circuit, a coefficient multiplier for varying the level of the output from the second arithmetic circuit according to a predetermined coefficient, an adder for summing the output from the first arithmetic circuit and the output from the second 1H delay circuit, a level control circuit for controlling the level of an output from the adder, and a switching device for sequentially providing an output from the level control circuit to first and second output terminals one for each horizontal period and also for sequentially providing the output from the first 1H delay circuit to the second and first output terminals one for each horizontal period.

4 Claims, 6 Drawing Sheets

R-Y  B-Y  R-Y  B-Y  R-Y  B-Y (a)

(b)

(c)

(d)

VIDEO SIGNAL PROCESSOR

BACKGROUND OF THE INVENTION

1. (Field of the Invention)

The present invention generally relates to a television signal processing circuitry for use in a magnetic information recording and/or reproducing apparatus such as, for example, a video camera or the like and, more particularly, to a video signal processing system used in a converter for converting a line sequential signal into simultaneous signals for improving the signal-to-noise ratio (S/N ratio).

2. (Description of the Prior Art)

An example of the prior art video signal processing system disclosed in the Japanese Laid-open Patent Publication No. 62-122492, published June 3, 1987, is reproduced in FIG. 6 of the accompanying drawings. Referring to FIG. 6 for the discussion of the prior art, the video signal processing system comprises an adder 2 having one of two input terminals connected with a system input terminal 1, a first 1H delay circuit 3 for delaying an output from the adder 2 for a length of time equal to one horizontal period (1H period), and a second 1H delay circuit 4 for delaying an output from the first 1H delay circuit 3 for a length of time equal to 1H period and for supplying the 1H delayed output of the first 1H delay circuit 3 to the other of the input terminals of the adder 2.

The illustrated video signal processing system also comprises a first changeover switch 5 having a pair of fixed contacts 5a and 5b and a movable contact 5c, connected to a first output terminal 7, and a second changeover switch 6 having a pair of fixed contacts 6a and 6b and a movable contact 6c connected to a second output terminal 8. The fixed contacts 5a and 6b of the first and second changeover switches 5 and 6, respectively, are connected to an input terminal of the first 1H delay circuit 3, and the fixed contacts 5b and 6a of the first and second changeover switches 5 and 6, respectively, are connected to an output terminal of the first 1H delay circuit 3.

In practice, each of the changeover switches 5 and 6 used therein is employed in the form of an electronic switch capable of alternately assuming one of the two states in response to a switching signal applied thereto; one state being in position to connect the terminal 5a or 6a to the output terminal 7 or 8 and the other state being in position to connect the terminal 5b or 6b to the output terminal 7 or 8. However, each of the changeover switches 5 and 6 may be in the form of a electromechanical switch.

The prior art video signal processing system of the above described construction operates in the following manner which will be described with the aid of waveforms of signals appearing in various points in the circuitry of FIG. 6.

The line sequential signal inputted to the input terminal 1 is of a waveform shown by (a) in FIG. 7. This line sequential signal applied to the input terminal 1 includes R-Y and B-Y color difference signals appearing alternately at the input terminal 1 one for each 1H period. While the line sequential signal at the input terminal 1 is supplied to one of the two input terminals of the adder 2, the line sequential signal which has been passed through the first 1H delay circuit 3 and then through the second 1H delay circuit 4 and, hence, delayed a length of time equal to twice the 1H period, that is, 2H periods, is also supplied to the other of the two input terminals of the same adder 2. Because of the 2H period delay relative to the incoming line sequential signal, the R-Y and B-Y color difference signals do not mix up and the adder 2 alternately outputs the R-Y and B-y color difference signals.

A waveform shown by (b) in FIG. 7 represents that of a switching signal having logic high and low levels alternating with each other. For each 1H period, the movable contacts 5c and 6c of the first and second changeover switches 5 and 6 are selectively engaged to the fixed contacts 5a or 6a and 5b or 6b in synchronism with the logical high and low levels of the switching signal, respectively. Because of this, a synchronized R-Y color difference signal of a waveform shown by (c) in FIG. 7 and a synchronized B-Y color difference signal of a waveform shown by (d) in FIG. 7 can be obtained at the respective output terminals 7 and 8.

On the other hand, since the output signal from the second 1H delay circuit 4 is added by the adder 2 to the incoming line sequential signal, this feedback system constitutes a recursive comb-type filter for the purpose of improving the S/N ratio. The recursive comb-type filter is well known in the art and is disclosed in, for example, the Japanese Laid-open Patent Publication No. 55-150669, published Nov. 22, 1980, and U.S. Pat. No. 4,684,976 issued Aug. 4, 1987, both of which are herein incorporated by reference.

As hereinabove discussed, the prior art video signal processing system is so designed as to make use of the recursive comb-type filter for the purpose of improving the S/N ratio. However, it has been found having problems in that the sharpness of the amplitude-frequency characteristic of the filter cannot be changed and, therefore, the extent to which the S/N ratio of video signals can be improved cannot be variable.

Also, since interpolation of a signal when the line sequential signal is converted into simultaneous signals is carried out by the use of a signal appearing at the time preceding 1H period, it has been found that, in terms of a picture reproduced on a cathode ray tube, the contour of the reproduced picture tends to represent indents when a signal having no vertical correlation is inputted.

The Japanese Laid-open Patent Publication No. 62-58793, published Mar. 14, 1987, discloses an approach to improve the S/N ratio of video signals in the video signal processing circuitry. Even with this approach, not only can the S/N ratio be varied, but also the problem associated with the reproduced picture having the contour full of indents cannot be eliminated since no proper signal interpolation is employed.

SUMMARY OF THE INVENTION

The present invention intends to substantially eliminate the above discussed problems inherent in the prior art video signal processing systems and is aimed at providing an improved video signal processing circuitry wherein the conversion of the line sequential signal into the simultaneous signals, the interpolation of average value signals and the improvement in S/N ratio can be accomplished simultaneously and wherein the extent to which the S/N ratio can be improved can be adjusted continuously.

The above described object of the present invention can be accomplished by providing an improved video signal processing circuitry which comprises a first arithmetic circuit adapted to receive a line sequential signal including a plurality of alternating signals of a frequency equal to one horizontal period, a first 1H delay circuit for delaying an output from the first arithmetic circuit for a length of time equal to one horizontal period, a second 1H delay circuit for delaying an output from the first 1H delay circuit for a length of time equal to one horizontal period, a second arithmetic circuit adapted to receive the line sequential signal and the output from the second 1H delay circuit, and a coefficient multiplier interposed between the first and second arithmetic circuit for varying the level of the output from the second arithmetic unit according to a predetermined coefficient. In this video signal processing circuitry, the line sequential signal which has been corrected in reference to the level of each of the line sequential signal and the output from the second 1H delay circuit and the predetermined coefficient can be outputted from the first arithmetic circuit.

The video signal processing circuitry also comprises an adder for summing the output from the first arithmetic circuit and the output from the second 1H delay circuit, a level control circuit for controlling the level of an output from the adder and a switching device for sequentially providing an output from the level control circuit to first and second output terminals one for each horizontal period and also for sequentially providing the output from the first 1H delay circuit to the second and first output terminals one for each horizontal period.

According to the present invention, an output signal from the first arithmetic circuit to which the line sequential signal is applied is delayed a length of time equal to the 2H period, which signal is processed in the second arithmetic circuit together with the line sequential signal to provide an output signal which is in turn supplied to the first arithmetic circuit after the level of the output signal from the second arithmetic circuit is changed by the coefficient multiplier. Accordingly, the transfer function will become a constant when the input frequency is n times or $(n+\frac{1}{2})$ times the line frequency and the system exhibits a characteristic of a comb-type filter wherein the envelope does not depend on the coefficient of the coefficient multiplier.

Also, the sharpness of the amplitude-frequency characteristic of the comb-type filter can be enhanced according to the co-efficient so that the extent to which the S/N ratio can be improved can be chosen as desired. At the same time, an averaged interpolation signal can be obtained by summing the output signal from the first arithmetic circuit together with the signal preceding the 2H period and controlling the level of the summed signal.

Preferably, the first arithmetic circuit is comprised of an adder, and the second arithmetic circuit is comprised of a subtractor operable to subtract the line sequential signal from the output from the second 1H delay circuit.

Alternatively, the first arithmetic circuit may be an subtractor operable to subtract the output of the coefficient multiplier from the line sequential signal, and the second arithmetic circuit may also be a subtractor operable to subtract the output of the second 1H delay circuit from the line sequential signal.

Again, the first arithmetic circuit may be a subtractor operable to subtract the line sequential signal from the output of the coefficient multiplier, and the second arithmetic circuit may be an adder.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

DETAILED DESCRIPTION OF THE EMBODIMENTS

Figure 1:
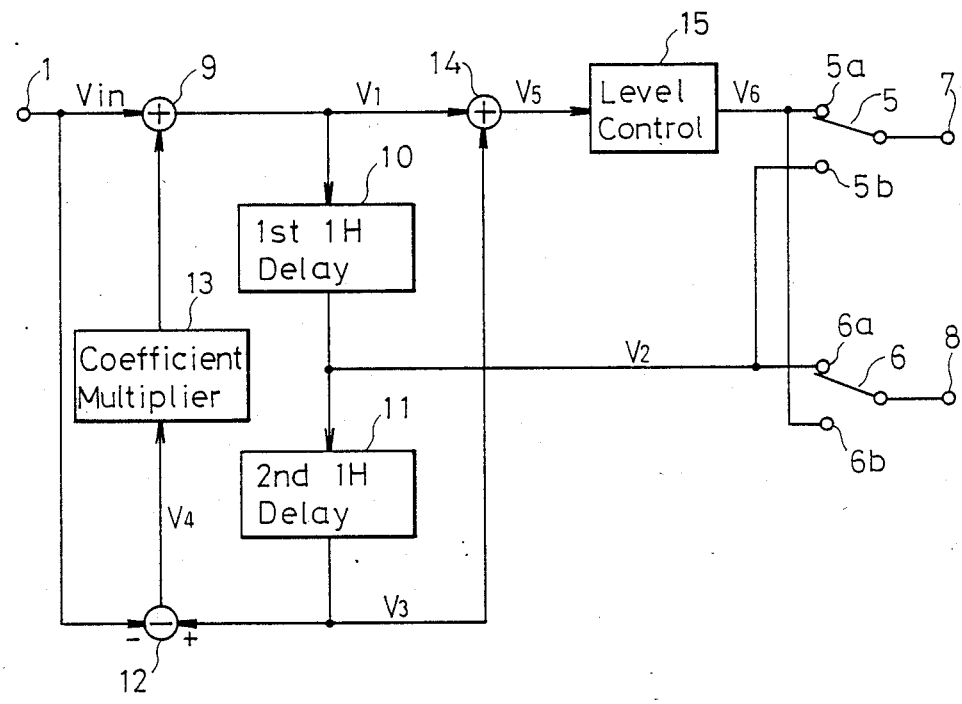
FIG. 1 is a block circuit diagram showing a video signal processing circuit according to a preferred embodiment of the present invention.

Referring first to FIG. 1, a signal processing circuit according to a first preferred embodiment of the present invention comprises a first arithmetic circuit employed in the form of a adder 9 to which the line sequential signal Vin applied to the input terminal 1 is supplied, and a first 1H delay circuit 10 connected with the adder 9 for delaying an output $V_1$ from the adder 9 for a length of time equal to one horizontal period (1H period), which circuit 10 is in turn connected with a second 1H delay circuit 11 operable to delay an output signal $V_2$ from the first 1H delay circuit 10. An output $V_3$ from the second 1H delay circuit 11 is supplied to a second arithmetic circuit which is employed in the form of a subtractor 12 to which the line sequential signal Vin is also supplied so that the subtractor 12 can give an output signal $V_4$ indicative of the difference between the line sequential signal Vin and the output signal $V_3$. The output signal $V_4$ from the subtractor 12 is supplied to a coefficient multiplier 13 at which the level of the output signal $V_4$ is modified according to a predetermined coefficient K so that the output signal emerging from the adder 9 can represent the line sequential signal Vin which has been corrected in reference to the line sequential signal Vin, the output signal $V_3$ from the second 1H delay circuit 11 and the predetermined coefficient K.

The illustrated video signal processing circuit also comprises an adder 14 operable to sum the output signal $V_1$ from the adder 9 and the output signal $V_3$ from the second 1H delay circuit 11 together, and a level control circuit 15 adapted to receive an output signal $V_5$ from the adder 14 and operable to control the level of the output signal $V_5$.

An output signal $V_6$ from the level control circuit 15 is connected to the fixed contact 5a of the first switch 5 and also to the fixed contact 6b of the second switch 6. On the other hand, the output signal $V_2$ from the first 1H delay circuit is supplied not only to the second 1H delay circuit 11, but also to the respective fixed contact 5b of the first switch 5 and 6a of the second switch 6.

For the purpose of discussion which will be made later, the transfer function of each of the first and second 1H delay circuits 10 and 11 is assumed to be G and the gain of the level control circuit 15 is ½. It is also to be noted that the coefficient K is variably preset in the coefficient multiplier 13.

The operation of the video signal processing circuitry of the above described construction according to the present invention will now be described with reference to FIGS. 2 and 3 which illustrate waveforms of various signals appearing in the circuitry of FIG. 1 and an operating characteristic of a comb-type filter.

The operation associated with an average value interpolation will first be described. Let it be assumed that the line sequential signal Vin in which the R-Y and B-Y color difference signals appear alternately one for each 1H period as shown by a waveform (a) in FIG. 2 is applied to the input terminal 1. Assuming, for the purpose of an easy understanding of the present invention, that the coefficient of the coefficient multiplier 13 is zero (0), the output signal $V_1$ from the adder 9 will be equal to the line sequential signal Vin as shown by a waveform (b) in FIG. 2, which waveform (b) is identical with the waveform (a) in FIG. 2.

Figure 2:
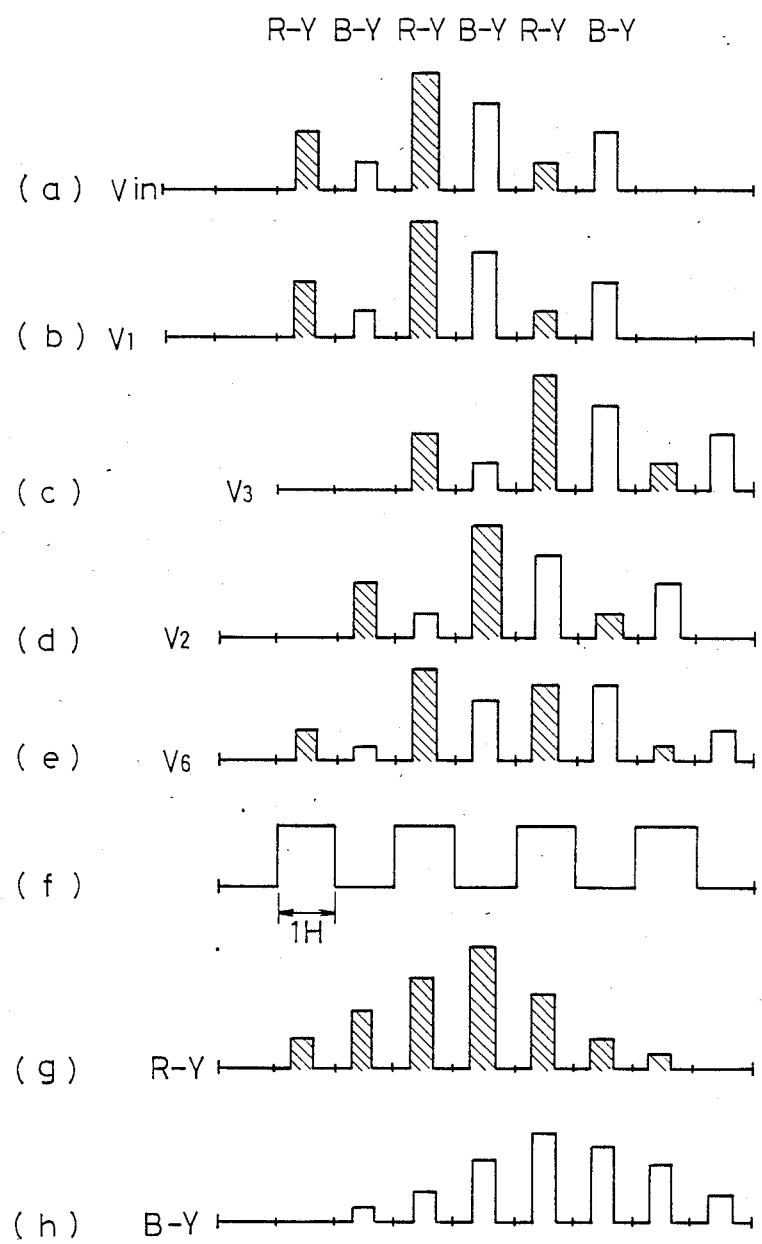
FIG. 2 is a diagram showing respective waveforms of various signals appearing in the video signal processing circuit shown in FIG. 1.

The waveform of the output signal $V_3$ from the second 1H delay circuit 11 is shown by (c) in FIG. 2, from which it will be readily understood that the output signal $V_3$ corresponds to the output signal $V_1$ which has been delayed a length of time equal to the 2H period. Similarly, the waveform of the output signal $V_2$ from the first 1H delay circuit 10 is shown by (d) in FIG. 2, from which it will be readily understood that the output signal $V_2$ corresponds to the output signal $V_1$ which has been delayed a length of time equal to the 1H period.

The output signal $V_6$ from the level control circuit 15 is such as shown by a waveform (e) shown in FIG. 2 since the output signal $V_6$ corresponds to the sum of the output signals $V_1$ and $V_3$ which has been obtained from the adder 14 and whose gain has been adjusted by the level control circuit 15 to one half (½) of the initial gain. Summing the signals together and dividing the resultant sum by 2 is an averaging process, and the signal represented by the waveform (e) shown in FIG. 2 therefore represents an average value signal. In other words, the level control circuit 15 provides the signal indicative of the average value of the sum of the output signals $V_1$ and $V_3$ generated respectively from the adder 9 and the second 1H delay circuit 11.

Referring now to the switches 5 and 6 shown in FIG. 1, when as shown by a waveform (f) in FIG. 2 the switches 5 and 6 are caused to assume a position to connect the fixed contacts 5a and 6a to the first and second output terminals 7 and 8, respectively, in response to a high level switching signal applied thereto during one 1H period and are also caused to assume a position to connect the fixed contact 5b and 6b to the first and second output terminals 7 and 8, respectively, in response to a low level switching signal applied thereto during the next succeeding 1H period, the average value signal $V_6$ from the level control circuit 15 and the output signal $V_2$ from the first 1H delay circuit 10 are respectively selected to appear at the first output terminal 7 during the logic high and low level states of the applied switching signals and, therefore, the R-Y color difference signal which has been interpolated by the average value can be obtained as shown by a waveform (g) in FIG. 2. On the other hand, the output signal $V_2$ from the first 1H delay circuit 10 and the average value signal $V_6$ from the level control circuit 15 are respectively selected to appear at the second output terminal 8 during the logic high and low level states of the applied switching signals and, therefore, the B-Y color difference signal which has been interpolated by the average value can be obtained as shown by a waveform (h) in FIG. 2.

The operation for improving the S/N ratio will now be described. The incoming line sequential signal Vin and the various output signals $V_1$ to $V_6$ have the following relationships with respect to each other.

$$V_6 = V_5 \cdot \tfrac{1}{2} \quad (1)$$

$$V_5 = V_1 + V_3 \quad (2)$$

$$V_3 = G^2 \cdot V_1 \quad (3)$$

$$V_1 = V_{in} + KV_4 \quad (4)$$

$$V_4 = V_3 - V_{in} \quad (5)$$

$$V_2 = G \cdot V_1 \quad (6)$$

When $V_1$ and $V_3$ to $V_5$ are removed from the equations (1) to (6), the line sequential signal Vin has the following relationship with the output signals $V_2$ and $V_6$.

$$V_6 = (\tfrac{1}{2}) \cdot [(1-K)/(1-KG^2)] \cdot (1+G^2) \cdot V_{in} \quad (7)$$

$$V_2 = [(1-K)/(1-KG^2)] \cdot G \cdot V_{in} \quad (8)$$

The respective transfer functions of the first and second delay circuits 10 and 11 may be chosen to be $\tau_L = 1/f_L$ (wherein $f_L$ represents the horizontal line frequency) where the video signal processing circuit deals with a television signal having a large line correlation which is expressed by $G = e^{-j\omega\tau_L} = (\cos \omega\tau_L - j\sin \omega\tau_L)$ wherein $\omega$ represents the angular frequency which is equal to $2\pi f$, f being the input frequency.

Accordingly, the transfer functions of the equations (7) and (8), respectively, can be expressed by the following equations (9) and (10).

$$(\tfrac{1}{2}) \cdot [(1-K)/(1-KG^2)] \cdot (1+G^2) = A/B \quad (9)$$

wherein:

$$A = (1-K)(1+\cos 2\omega\tau_L) - j(1-K) \cdot \sin 2\omega\tau_L, \text{ and} \quad (10)$$

$$B = 2(1 - K \cdot \cos 2\omega\tau_L) + j2K \cdot \sin 2\omega\tau_L$$

$$[(1-K)/(1-KG^2)] \cdot G = C/D$$

wherein:
$$C = (1-K) \cos \omega\tau_L - j(1-K) \sin \omega\tau_L, \text{ and}$$

$$D = (1-K \cdot \cos 2\omega\tau_L) + jK \sin 2\omega\tau_L$$

Figure 3A:
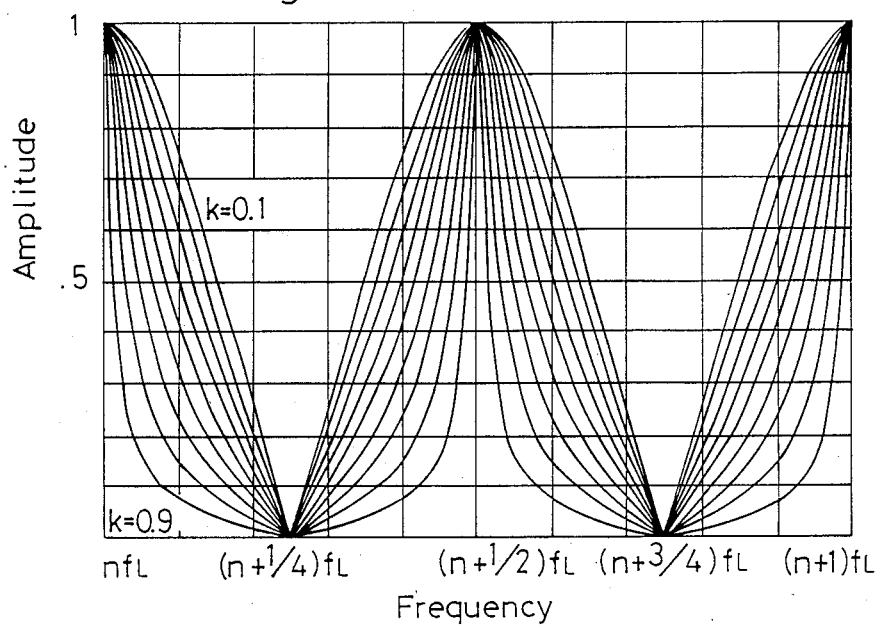
FIGS. 3(a) and 3(b) are graphs showing characteristics of the comb-type filter to which the present invention pertains.
Figure 3B:
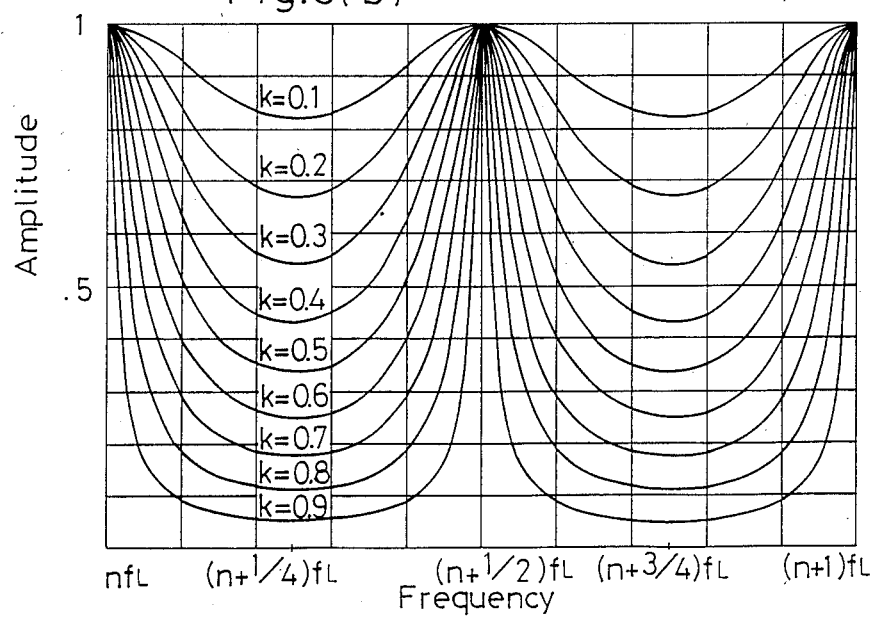

Assuming that n is a positive integer and when the frequency and the amplitude are taken on the axis of abscissas and the axis of ordinates, respectively, the transfer functions expressed respectively by the equations (9) and (10) can be plotted as shown in respective graphs shown in FIGS. 3(a) and 3(b), respectively. Accordingly, the transfer functions expressed respectively by the equations (9) and (10) represent comb-type filter characteristics exhibiting hills at respective frequencies n times and $(n+\frac{1}{2})$ times of the horizontal line frequency and dales at respective frequencies $(n+\frac{1}{4})$ times and $(n+\frac{3}{4})$ times of the horizontal line frequency and, therefore, it can be readily understood that, when the coefficient K is variable, the sharpness of the amplitude-frequency characteristic of the comb-type filter varies with the consequence that the extent to which the S/N ratio can be improved can be adjusted as desired.

Also, when $f=n.f_L$, the transfer functions expressed by the equations (9) and (10) will assume 1 regardless of the coefficient K and, therefore, the amplitude of the signal will not vary even though the coefficient K is varied to vary the extent to which the S/N ratio can be improved. Accordingly, the present invention does not require the use of a signal amount normalizing circuit for correcting the signal amount and makes it possible to continuously vary the extent to which the S/N ratio can be improved.

Although in the foregoing description reference has been made to the line sequential signal having the R-Y and B-Y color difference signal, the present invention can be equally applicable to the use of the line sequential signal having R and B color signals.

Figure 4:
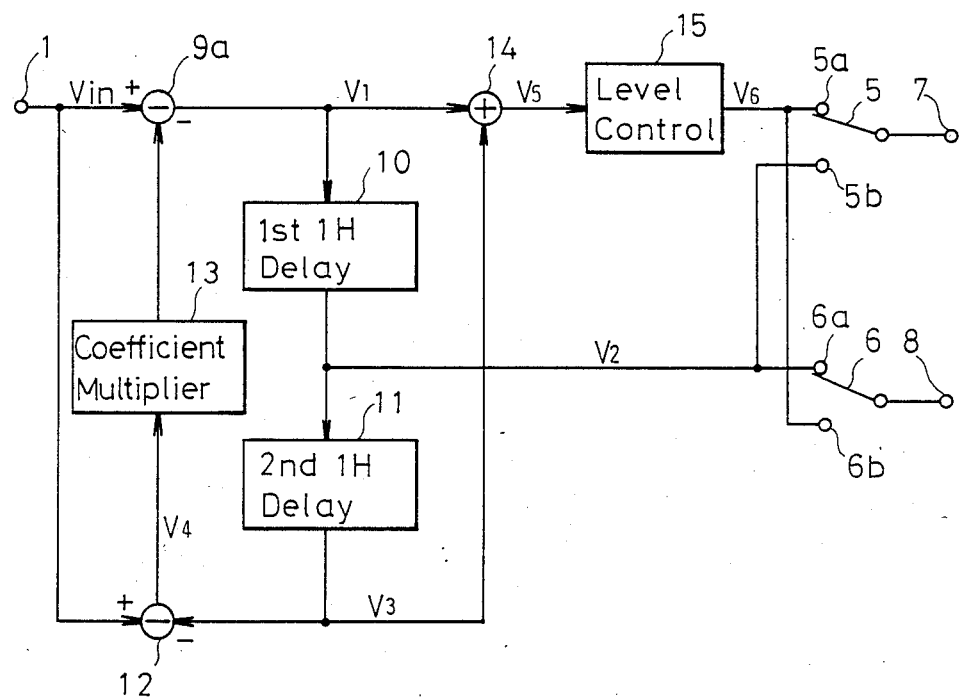
FIGS. 4 and 5 are views similar to FIG. 1, showing the video signal processing circuit according to second and third preferred embodiments of the present invention.
Figure 5:
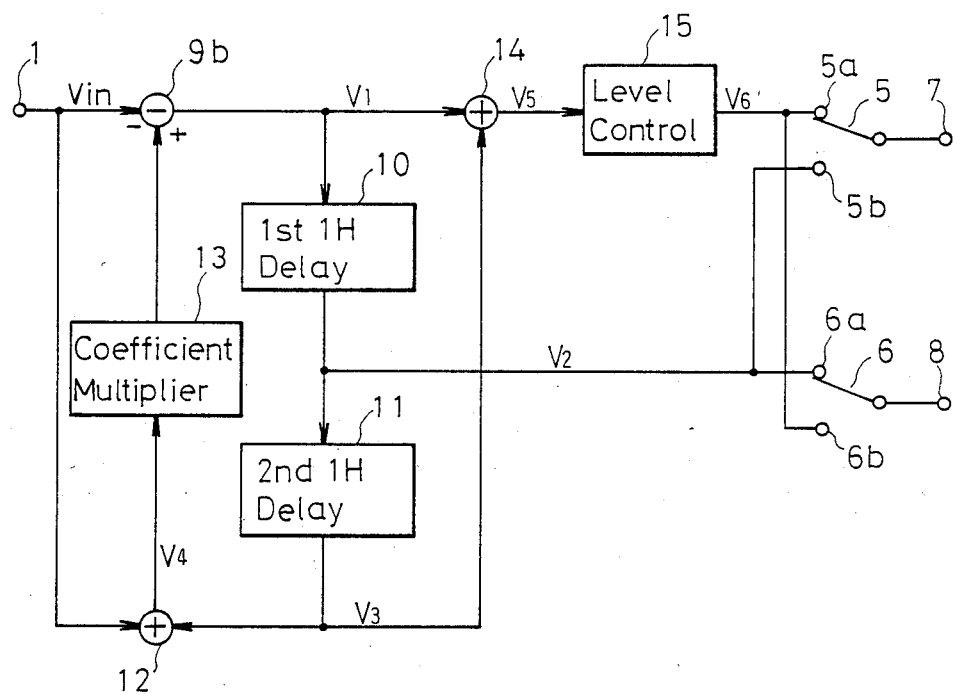
Figure 6:
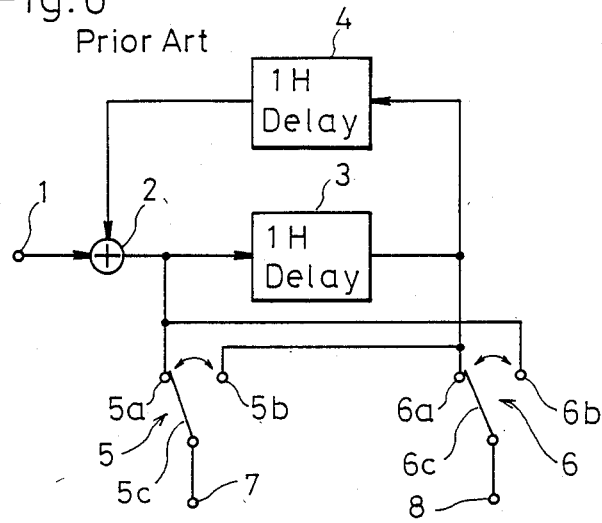
FIG. 6 is a block circuit diagram showing the prior art video signal processing circuit.
Figure 7:
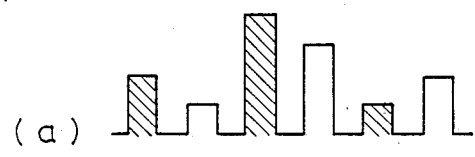
FIG. 7 is a diagram showing the respective waveforms of the signals appearing in the prior art video signal processing circuit.
Figure 7:
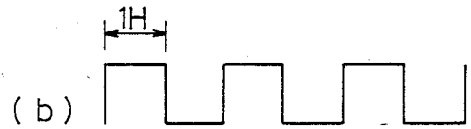
Figure 7:
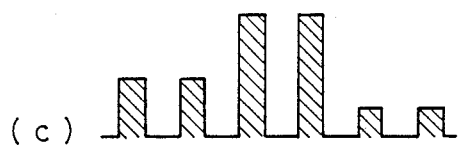
Figure 7:
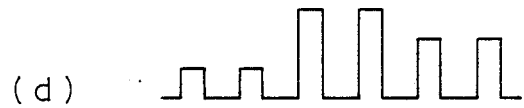

In addition, the signal processing circuitry of the foregoing preferred embodiment of the present invention can be modified as shown in FIGS. 4 and 5 with no performance and effect substantially reduced.

In the modification shown in FIG. 4, instead of the adder 9 used in the foregoing embodiment, a subtractor 9a is employed and, consequent upon this, input connections to the subtractor 12 are reversed with respect to those shown in FIG. 1. In this case, the subtractor 9a is operable to subtract the output signal from the coefficient multiplier 13 from the line sequential signal Vin and the subtractor 12 is operable to subtract the output signal $V_3$ of the second 1H delay circuit 11 from the line sequential signal Vin.

In the modification shown in FIG. 5, instead of the use of the adder 9 employed in the foregoing embodiment of FIG. 1, a subtractor 9b operable to subtract the line sequential signal Vin from the output signal of the coefficient multiplier 13 is employed and, consequent upon this, instead of the subtractor 12, an adder 12a operable to sum the line sequential signal Vin and the output signal $V_3$ from the second 1H delay circuit 11 together is employed. Even in this case, except that the output signal exhibits a phase reverse to that in the foregoing embodiment of FIG. 1, the video signal processing circuitry operates in a manner substantially similar to that according to the foregoing embodiment of FIG. 1.

It has now become clear that, according to the present invention, the line sequential signal and the signal which has been delayed a length of time equal to the 2H period are calculated in the second arithmetic circuit whose output level is varied by the coefficient multiplier for calculation together with the line sequential signal in the first arithmetic circuit. Accordingly, the video signal processing circuitry according to the present invention is effective to exhibit the comb-type filter characteristic with improvement accomplished in the conversion of the line sequential signal into the simultaneous signals and, also, the extent to which the S/N ratio can be improved.

Also, since the output signal from the first arithmetic circuit and the signal which has been delayed length of time equal to the 2H period are, after having been summed, controlled in level, the interpolation of the average value signal can be easily accomplished.

Although the present invention has fully been described in connection with the preferred embodiments thereof with reference to the accompanying drawings used only for the purpose of illustration, those skilled in the art will readily conceive numerous changes and modifications within the framework of obviousness upon the reading of the specification herein presented of the present invention. By way of example, although in the foregoing embodiments the coefficient multiplier 13 has been described as having the variable coefficient K, a coefficient multiplier having a fixed coefficient so selected as to eventually attain the desired extent to which the S/N ratio can be improved may be employed.

Accordingly, such changes and modifications are, unless they depart from the spirit and scope of the present invention as delivered from the claims annexed hereto, to be construed as included therein.

What is claimed is:

1. A video signal processing circuitry which comprises:
    a first arithmetic circuit adapted to receive a line sequential signal including a plurality of alternating signals of a frequency equal to one horizontal period;
    a first 1H delay circuit for delaying an output from the first arithmetic circuit for a length of time equal to one horizontal period;
    a second 1H delay circuit for delaying an output from the first 1H delay circuit for a length of time equal to one horizontal period;
    a second arithmetic circuit adapted to receive the line sequential signal and the output from the second 1H delay circuit;
    a coefficient multiplier interposed between the first and second arithmetic circuit for varying the level of the output from the second arithmetic circuit according to a predetermined coefficient, the line sequential signal, which has been corrected in reference to the level of each of the line sequential signal and the output from the second 1H delay circuit and the predetermined coefficient, being outputted from the first arithmetic circuit;
    an adder for summing the output from the first arithmetic circuit and the output from the second 1H delay circuit;
    a level control circuit for controlling the level of an output from the adder; and
    a switching device for sequentially providing an output from the level control circuit to first and second output terminals one for each horizontal period and also for sequentially providing the output from the first 1H delay circuit to the second and first output terminals one for each horizontal period.

2. The video signal processing circuitry as claimed in claim 1, wherein the first arithmetic circuit is comprised of an adder, and the second arithmetic circuit is comprised of a subtractor operable to subtract the line sequential signal from the output from the second 1H delay circuit.

3. The video signal processing circuitry as claimed in claim 1, wherein the first arithmetic circuit is a subtractor operable to subtract the output of the coefficient multiplier from the line sequential signal, and the second arithmetic circuit is a subtractor operable to subtract the output of the 1H delay circuit from the line sequential signal.

4. The video signal processing circuitry as claimed in claim 1, wherein the first arithmetic circuit is a subtractor operable to subtract the line sequential signal from the output of the coefficient multiplier, and the second arithmetic circuit is an adder.

* * * * *